(12) United States Patent
Muhich

(10) Patent No.: US 7,163,081 B2
(45) Date of Patent: Jan. 16, 2007

(54) ELASTIC STRAP ASSEMBLY FOR TREE STAND SAFETY BELTS AND HARNESSES

(76) Inventor: Anthony J. Muhich, 2211 Brookwood Ct., Joliet, IL (US) 60435

(*) Notice: Subject to any disclaimer, the term of this patent is extended or adjusted under 35 U.S.C. 154(b) by 611 days.

(21) Appl. No.: 10/666,295

(22) Filed: Sep. 18, 2003

(65) Prior Publication Data
US 2005/0072632 A1    Apr. 7, 2005

(51) Int. Cl.
A62B 1/08      (2006.01)
A62B 35/00    (2006.01)
E04G 3/00     (2006.01)

(52) U.S. Cl. .......................... 182/3; 119/857; 182/187
(58) Field of Classification Search .................. 182/3, 182/9, 187, 188, 135, 136; 244/151 R; 119/857, 119/770
See application file for complete search history.

(56) References Cited

U.S. PATENT DOCUMENTS

| | | | |
|---|---|---|---|
| 1,829,628 A | 10/1931 | Behr | |
| 1,971,571 A | 8/1934 | McMullen | |
| 2,661,888 A | 12/1953 | Sidlinger | |
| 3,458,188 A | 7/1969 | Infante | |
| 3,937,461 A | 2/1976 | Lew | |
| 4,100,996 A | 7/1978 | Sharp | |
| 4,236,602 A * | 12/1980 | Leggett | 182/187 |
| 4,273,215 A * | 6/1981 | Leggett | 182/3 |
| 4,667,773 A * | 5/1987 | Davis | 182/187 |
| 4,714,135 A | 12/1987 | Bell | |
| 4,745,883 A * | 5/1988 | Baggetta | 119/770 |
| 4,923,048 A | 5/1990 | Cole | |
| 4,951,778 A * | 8/1990 | Halvorson | 182/9 |
| 5,052,514 A | 10/1991 | Rezmer | |
| 5,113,981 A | 5/1992 | Lantz | |
| 5,141,074 A | 8/1992 | Sulowski | |
| 5,165,499 A | 11/1992 | Bell | |
| 5,341,896 A | 8/1994 | Amacker | |
| 5,487,444 A | 1/1996 | Dennington | |
| 5,738,046 A * | 4/1998 | Williams et al. | 119/770 |
| 6,012,993 A | 1/2000 | Guerriero | |
| 6,125,966 A * | 10/2000 | Jones | 182/3 |
| 6,340,524 B1 * | 1/2002 | Tang et al. | 428/364 |
| 6,405,685 B1 * | 6/2002 | Cox | 119/857 |
| 6,523,643 B1 * | 2/2003 | Rizza | 182/187 |
| 6,533,066 B1 * | 3/2003 | O'Dell | 182/3 |

FOREIGN PATENT DOCUMENTS

| | | |
|---|---|---|
| DE | 710340 | 9/1941 |
| DE | 23 41 619 | 2/1975 |

* cited by examiner

*Primary Examiner*—Hugh B. Thompson, II
(74) *Attorney, Agent, or Firm*—Sturm & Fix LLP

(57) ABSTRACT

An elastic strap assembly for tree stands, safety belts and harnesses. The strap assembly is adapted to be attached to a first strap which can be disposed around and secured to a tree and a second strap which is disposed around a person standing in a tree stand or the like. The strap assembly is between six and fifteen inches long under no tension. The strap assembly is capable of stretching at least three inches under a force of 300 pounds. A tether is also provided and is attached between the strap around the tree and the strap around the person in case the elastic strap assembly would happen to break for any reason.

23 Claims, 8 Drawing Sheets

US 7,163,081 B2

ELASTIC STRAP ASSEMBLY FOR TREE STAND SAFETY BELTS AND HARNESSES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates to safety equipment for hunters and more particularly to an improved tether for safety belts or safety harnesses.

2. Description of the Related Art

It is well known that, when hunting deer or other game from a tree stand, people who do not use a safety strap or harness to keep them from falling from the tree stand are at risk of being injured from an accidental fall.

A typical prior art safety strap consists of a nylon strap around a tree, a nylon strap around the chest of the hunter, and a nylon tether attaching the two straps together. Sometimes the strap around the person consists of several straps, referred to as a harness. These tethers come from various manufacturers in various lengths.

When a hunter is standing on a tree stand platform, the platform is usually ten to twenty feet from the ground below. Accompanying the danger of falling is the emotional fear of falling that may be experienced by the hunter. Even though the hunter may know that he has the appropriate safety strap or harness on, the hunter can experience some unsteadiness standing ten to twenty feet off of the ground. This unsteadiness can be exacerbated by the appearance of a deer or other game animal being pursued by the hunter. An extreme case of excitement when such game animal appears is commonly known as "buck fever". So in the course of moving slowly to not scare the animal, yet executing a shot with a bow and arrow or a gun, the factor of steadiness becomes critical.

In situations where the hunter is positioned far enough out on the platform of the tree stand so that the tether is tight, the hunter feels more secure than without such tug on the safety strap. In such position the hunter is not only standing on two feet but has a third point of steadiness if he has the tether stretched tight. The hunter feels more safe, more steady and can mentally and physically execute the shot with more reliability and with more confidence than if the tether was not tight.

It is not always convenient for the hunter to remain standing at the proper distance from the tree to keep the tether tight, and movement to such position when the game being pursued is close risks making the game animal aware of the hunter's presence, resulting in the hunter losing an opportunity to get a shot at such game. Hunters often stay in tree stands from several hours at a time, so remaining in one standing position all of such time is not practical, if not impossible.

Another problem associated with nylon tethers is that when a hunter does fall, he comes to an abrupt stop when the tether becomes tight because the nylon strap typically used for the tether has negligible elasticity, i.e. no shock absorbency.

Consequently there is a need for a practical solution to the aforementioned problems.

SUMMARY OF THE INVENTION

The present invention relates to an elastic strap assembly for tree stands, safety belts and harnesses. The strap assembly is adapted to be attached to a first strap, which can be disposed around and secured to a tree, and a second strap which is disposed around a person standing in a tree stand or the like. The strap assembly is between six and fifteen inches long under no tension. The strap assembly is capable of stretching at least three inches under a force of 150 to 300 pounds. A tether is also provided and is attached between the strap around the tree and the strap around the person in case the elastic strap assembly would happen to break for any reason.

An object of the present invention is to provide a shock absorbing elastic strap assembly for tree stand safety belts and harnesses.

Another object of the present invention is to provide an elastic strap assembly which applies a constant tension to the safety strap or harness so that the user always knows where he is on the stand platform, even in the dark.

Another object of the present invention is to provide a steady third point of contact with the tree and tree stand for improving concentration and steadiness while executing a shot at a game animal.

Other objects, advantages, and novel features of the present invention will become apparent from the following detailed description of the invention when considered in conjunction with the accompanying drawings.

DETAILED DESCRIPTION OF THE PREVERRED EMBODIMENTS

Figure 1:
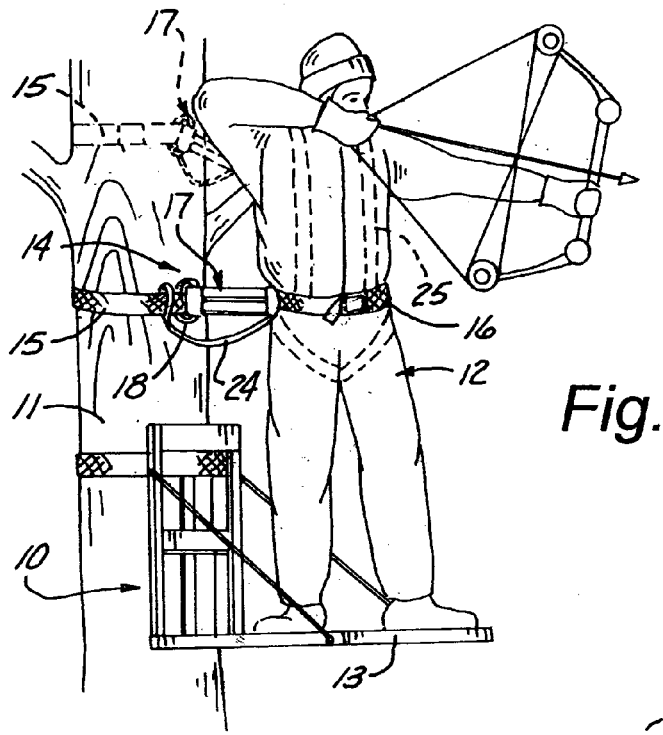
FIG. 1 is a side elevational view showing a hunter standing in a tree on a tree stand platform and having the present invention attached to the tree and to the hunter.

Referring now to the drawings wherein like reference numerals designate identical or corresponding parts throughout the several views, FIG. 1 shows a tree stand (10) attached to a tree (11) and having a hunter (12) standing on a platform (13) of the tree stand (10).

The present invention relates to a safety strap or safety harness assembly (14) which includes in the preferred embodiment a nylon strap (15) attached to the tree (11) a strap or belt (16) that extends around the hunter and an elastic strap assembly (17) having a D-ring (18) on one end (24) thereof and another D-ring (19) on the other end (25) thereof and an intermediate portion (20). The strap assembly (17) is molded in one piece from hard rubber. In the preferred embodiment the D-rings are solid steel and are molded into an opening (22) and (23) in the generally barrel shaped ends (44), (45) of the rubber one-piece assembly (14). The specifications of the rubber in the preferred embodiment are as follows: natural rubber (NR)+artificial rubber (BR)+black dye of a ratio NR/BR=25/1 with a load capacity of 167 to 182 pounds and a hardness of 50 degrees Shore A.

Figure 3:
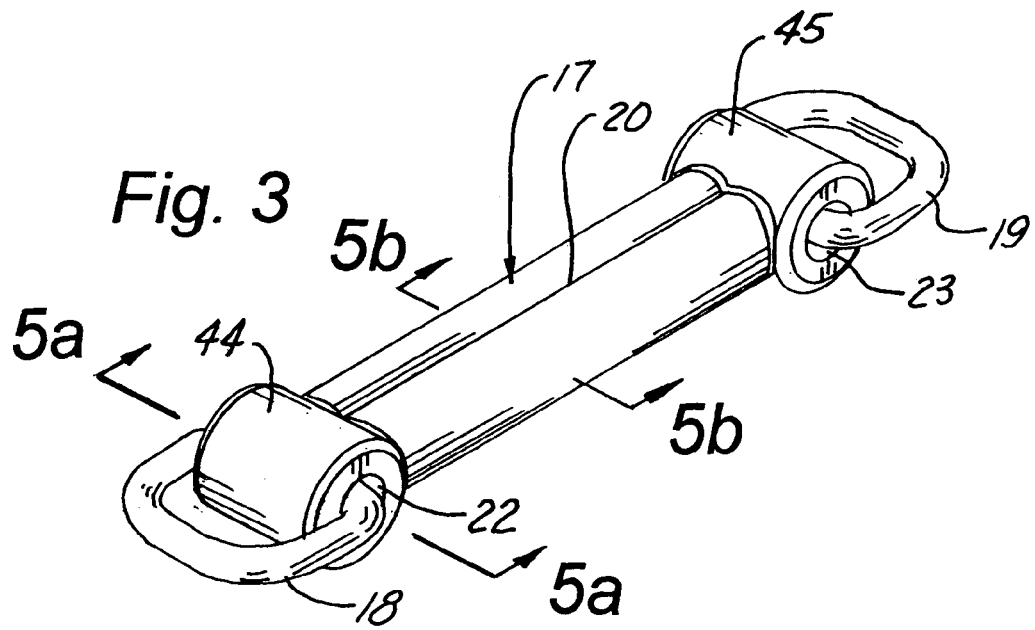
FIG. 3 is a perspective view of the safety strap assembly of the present invention having a main portion made out of rubber and two D-rings on the end thereof.
Figure 4:
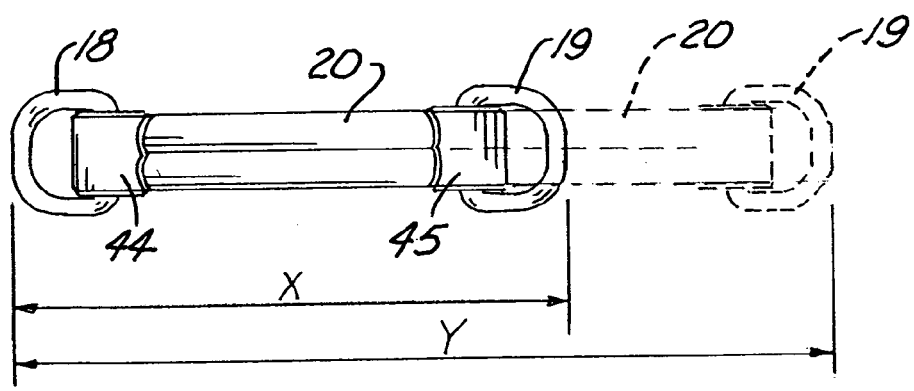
FIG. 4 is a top view of the safety strap assembly showing it in a position in a relaxed position in solid lines and a stretched position in dashed lines.
Figure 5A:
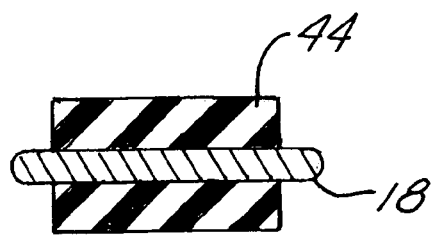
FIG. 5a is a cross sectional view taken along line 5a—5a of FIG. 3.
Figure 5B:
FIG. 5b is a cross sectional view taken along line 5b—5b of FIG. 3.

As can best be seen by reference to FIGS. 3 through 5, the intermediate portion (20) of the strap assembly (14) has a generally figure eight cross-sectional configuration; wherein the barrel shaped ends (44), (45) are aligned generally perpendicular to the longitudinal axis of the intermediate portion (20).

Referring back to FIG. 1, the assembly (17) which is attached to the strap (16) around the person (12) can take on various configurations. For example it can be part of a full body harness represented by not only the belt (16) but by the dashed line straps shown in FIG. 1 or it can take the form of just a top harness as shown in dashed lines in FIG. 2.

In operation, once the hunter is on the platform with everything hooked up as shown in solid lines in FIG. 1, he can stand in the position of FIG. 1 wherein the elastic strap assembly (17) is in a relaxed position.

Figure 2:
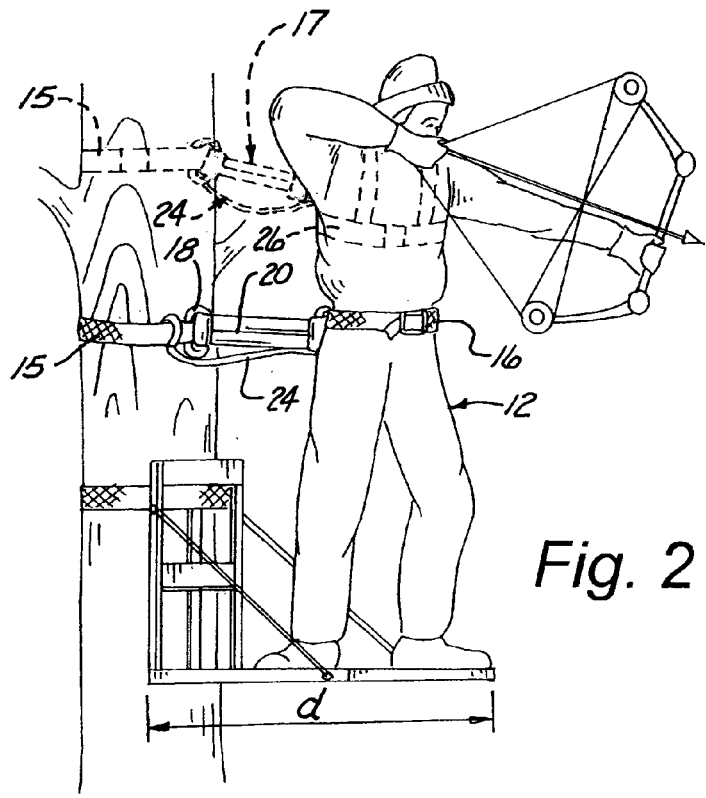
FIG. 2 is a view like FIG. 1 but showing the hunter having stretched the elastic safety strap assembly of the present invention.

Referring now to FIG. 2 it is noted that the hunter has moved out on the platform (13) so as to stretch the rubber portion (20) of the elastic strap assembly. This gives the hunter a secure feeling that he is truly being held by something to the tree and gives him a three-point attachment to the tree. A tether (24) which can also be made of nylon strap material is provided just in case the elastic strap assembly (17) would break. In certain instances, it might also limit the amount that the elastic portion (20) can stretch because the nylon strap (24) is essentially not stretchable beyond its length.

Referring again to FIG. 1, the present invention is shown in dashed lines as an alternative arrangement wherein it is strapped higher to the tree and would be connected somewhere to the body harness straps (25) or (26) shown in dashed lines in FIGS. 1 and 2. In this arrangement, it would work the same as previously described wherein in FIG. 1, the elastic strap assembly (17) is in an unstretched position and in FIG. 2 the elastic strap assembly (17) is in a stretched position.

FIG. 4 shows the strap of a length X which is the unstretched condition of the strap assembly. This distance X is preferably between six and fifteen inches long under no tension. The distance Y shown in FIG. 4 is the distance to which the strap can stretch and the difference between X-Y under a force of 300 pounds is at least three inches and no more than fifteen inches.

Figure 15:
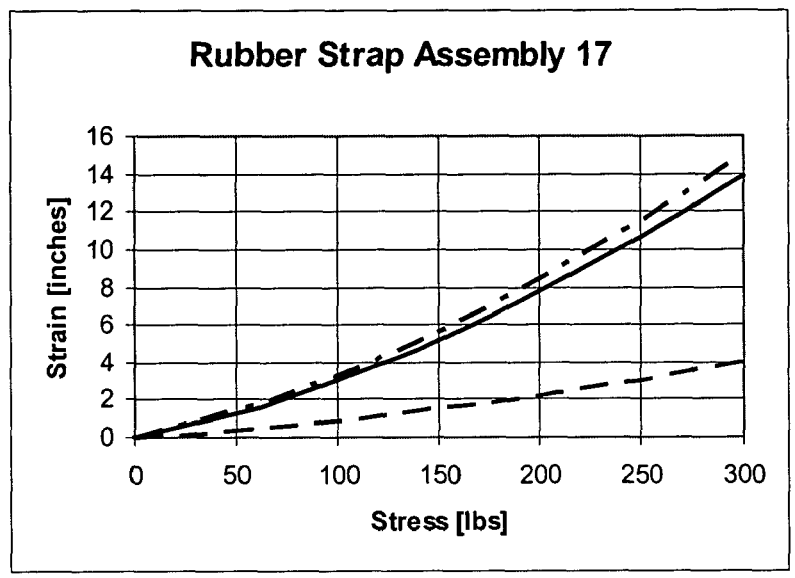
FIG. 15 is a plot of an elongation (strain) versus a weight applied (stress) for a first embodiment of the present invention.

A plot of elongation (strain, Y-X) versus weight applied (stress) to the strap is shown in FIG. 15 as a solid line. A minimum elongation curve (dashed line) is also shown to differentiate the present invention from simply using a rope tether with minimal elongation. An upper limit of elongation, shown as a dot-dashed line in FIG. 15, may also be specified. Too great an elongation for a given weight may result in a feeling of insecurity for the user.

It is important that the strap assembly (17) not be too long. Looking to FIG. 2, it is noted that the distance of a tree stand platform D can vary but it is not a long distance under ordinary circumstances. So it is desirable that in the fully stretched condition Y shown in FIG. 4, that the hunter (12) would still be on the platform (13) and not off of the front thereof and thereby in a dangerous or precarious situation. It is also desirable that the hunter have some flexibility as to where he is positioned on the tree stand platform (13) so the hunter will feel a constant pressure as he moves outwardly from any position shown in FIG. 1 to any other position until the rubber portion (20) is fully stretched by the total Y distance.

Figure 6:
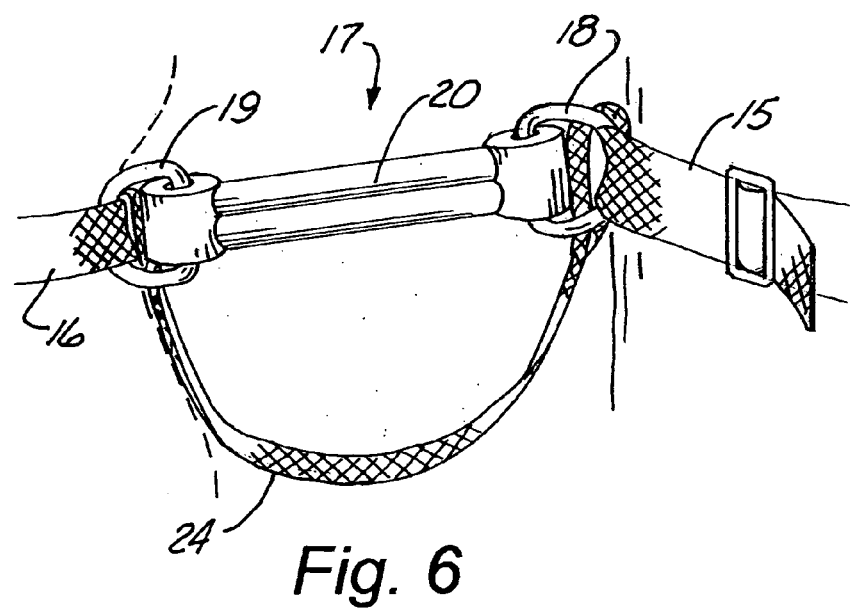
FIG. 6 is an elevational view of the elastic safety strap assembly shown attached at one end to a strap around a tree and at the other end to a strap around a person in a relaxed and unstretched condition of the elastic safety strap assembly.
Figure 7:
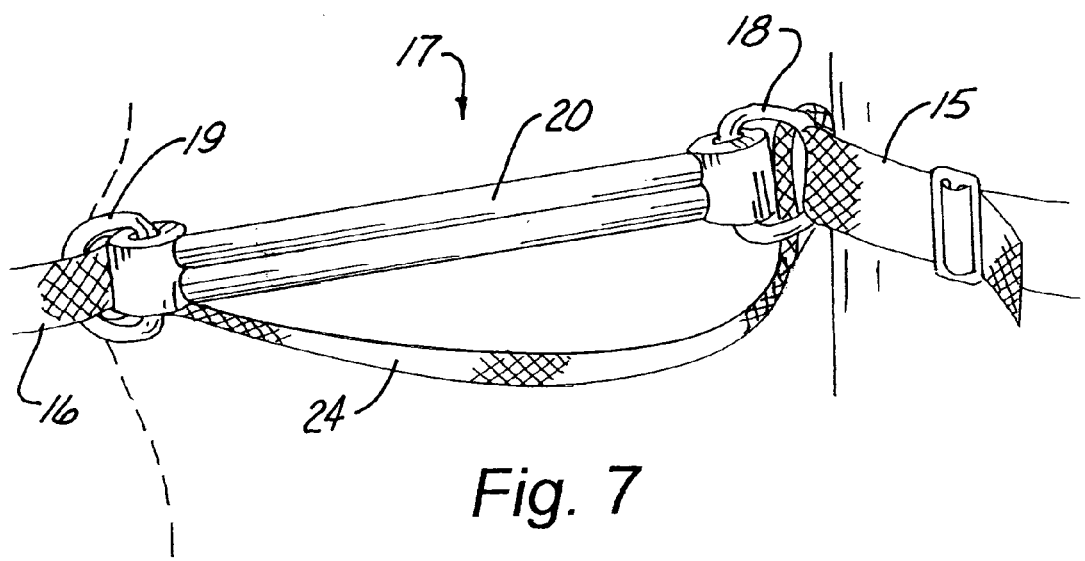
FIG. 7 is a view like FIG. 6 but showing the elastic safety strap assembly in a stretched position.

FIGS. 6 and 7 show a more detailed view of just the elastic strap assembly (17) and the strap (15) around the tree and the strap (16) around the hunter.

Figure 13:
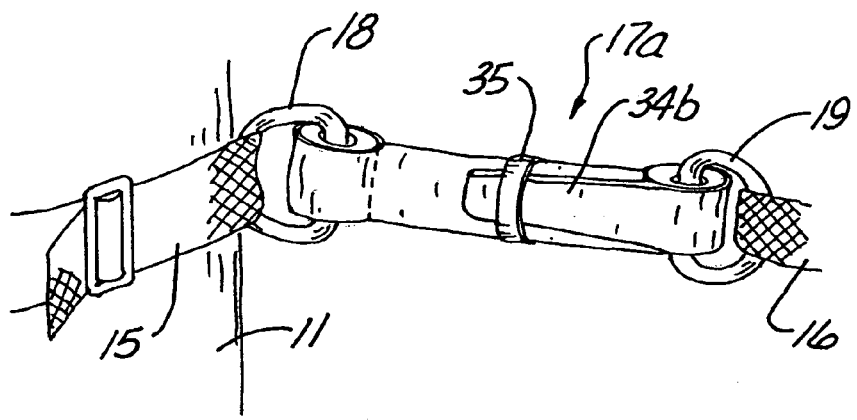
FIG. 13 is a view of the modified version of the present invention shown attached at one end to a strap around a tree and at the other end to a strap around the person, the elastic strap assembly being in an unstretched or relaxed condition.
Figure 14:
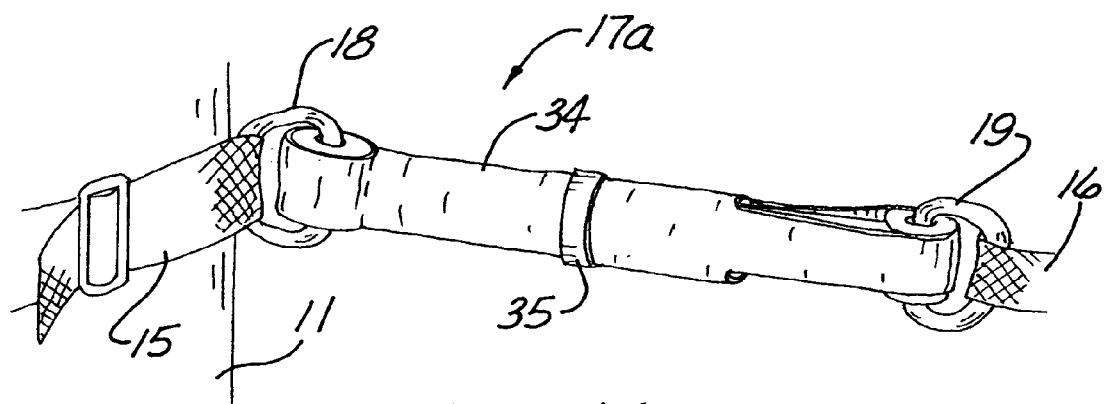
FIG. 14 is a view like FIG. 13 but showing the elastic strap assembly stretched to its maximum extent as limited by a nylon sheath extending therearound.

Referring now to FIGS. 8–14, a second embodiment of the present invention is shown. In actuality, everything is identical in FIGS. 8 and 9 except instead of a tether (24) there is a tether sheath around the elastic strap assembly that it shown in FIGS. 3 and 4. The modified sheath assembly (34) shown in FIG. 11B is preferably a nylon sheath sewn and cut to the configuration shown in FIGS. 11B, 11C and 12. One end (34a) has an opening to allow insertion of a D-ring (18) and the other end (34b) has a long cutout portion to allow insertion of D-ring (19). The long slot adjacent the end (34b) is so that the portion (34b) can be tucked under a loop (35) shown best in FIG. 13 to keep it out of the way in an unstretched condition as shown in FIG. 13. As the rubber portion (14) is stretched from a relaxed position in FIG. 13 to a somewhat stretched position in FIG. 11B, the end (34b) will be pulled out from under the loop (35). Then, as the rubber portion (20) stretches more, it will eventually be stretched to the position shown in 11C and at that point cannot be stretched more because it is being held from stretching more by the nylon sheath (34).

Figure 8:
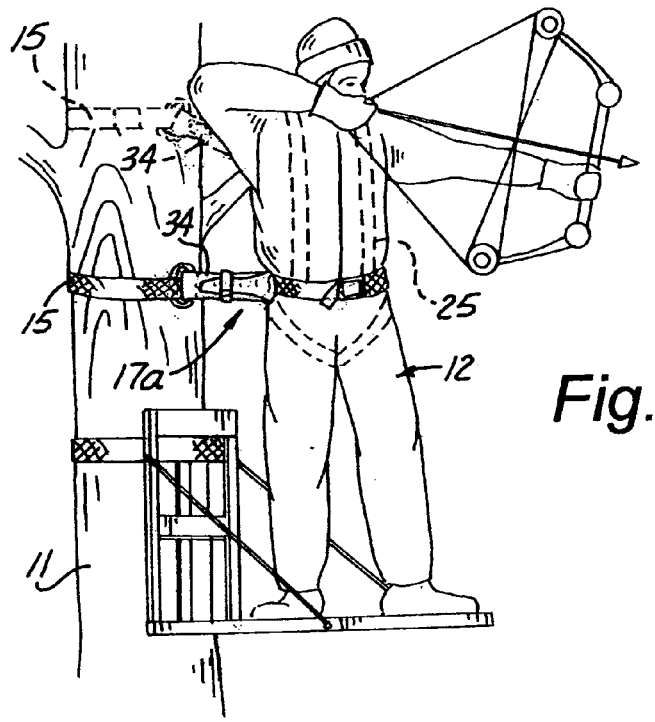
FIG. 8 is a view like FIG. 1 showing a modified form of the invention in a relaxed position.
Figure 9:
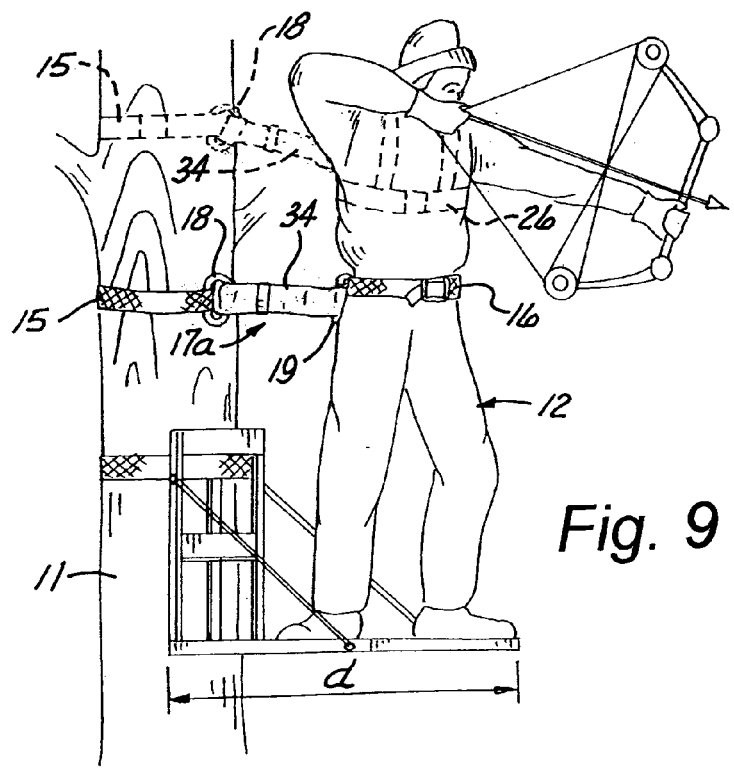
FIG. 9 shows the modified version of the present invention of FIG. 8 in a stretched position.
Figure 10:
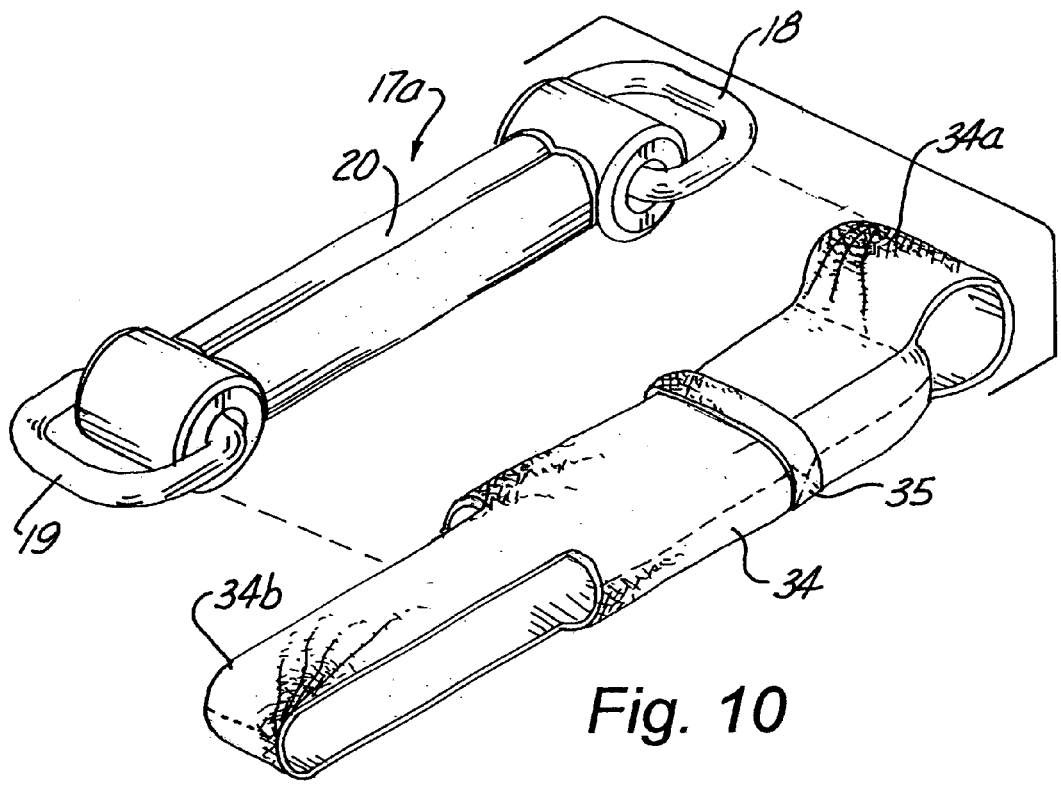
FIG. 10 shows the modified version with a nylon sheet separate from the rubber strap assembly which is normally inside of it.
Figure 11A:
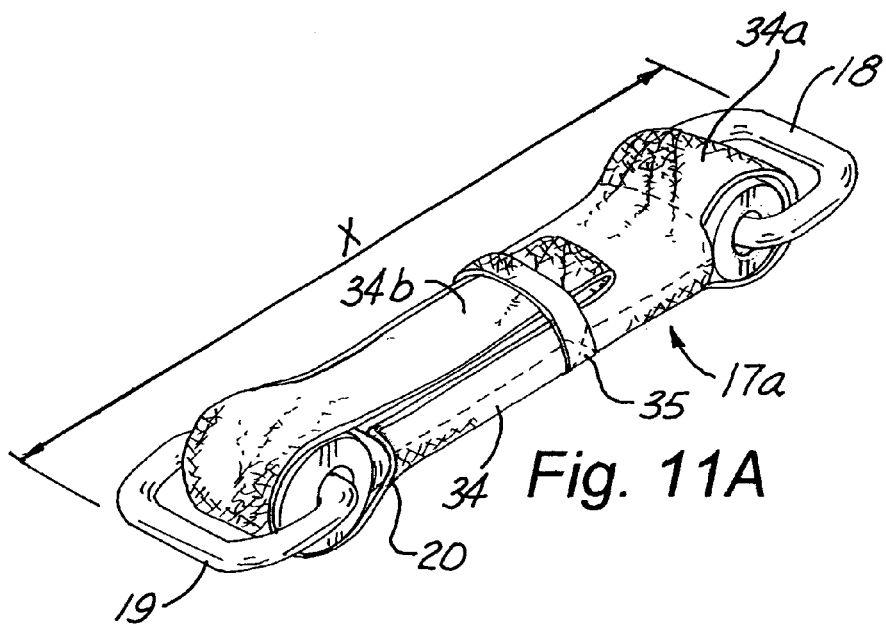
FIG. 11A shows the modified invention folded and ready to use.
Figure 11B:
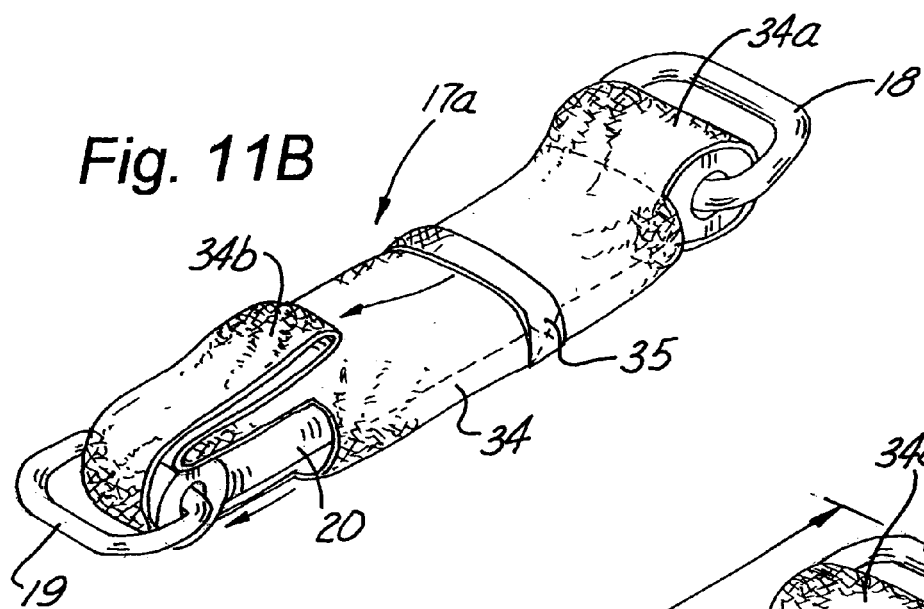
FIG. 11B shows the present invention which is essentially identical to that shown in FIGS. 3–5 except that it has a nylon sheath around it and is shown in a semi-stretched position in FIG. 11B.
Figure 11C:
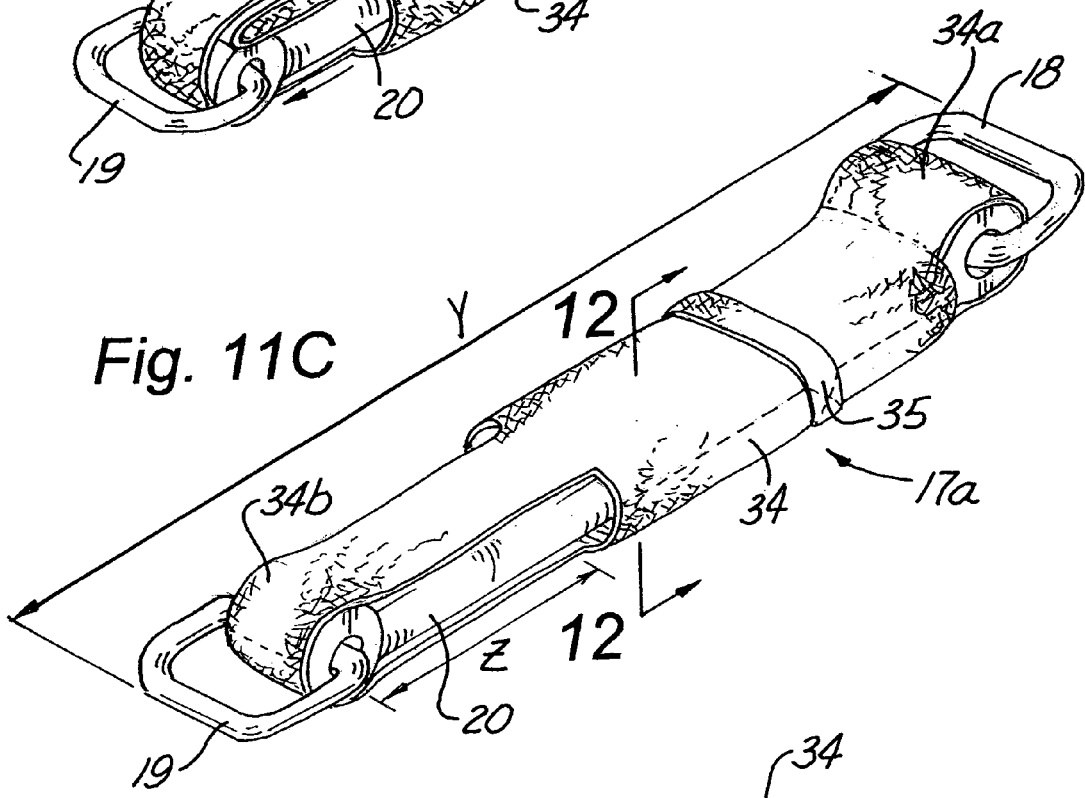
FIG. 11C shows the modified invention stretched out fully in the sheath thereof.
Figure 12:
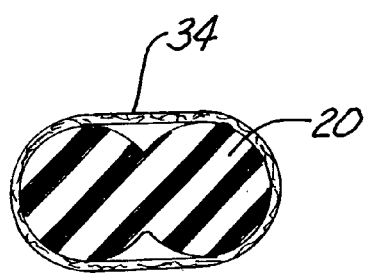
FIG. 12 is a cross sectional view taken along line 12—12 of FIG. 11C.
Figure 16:
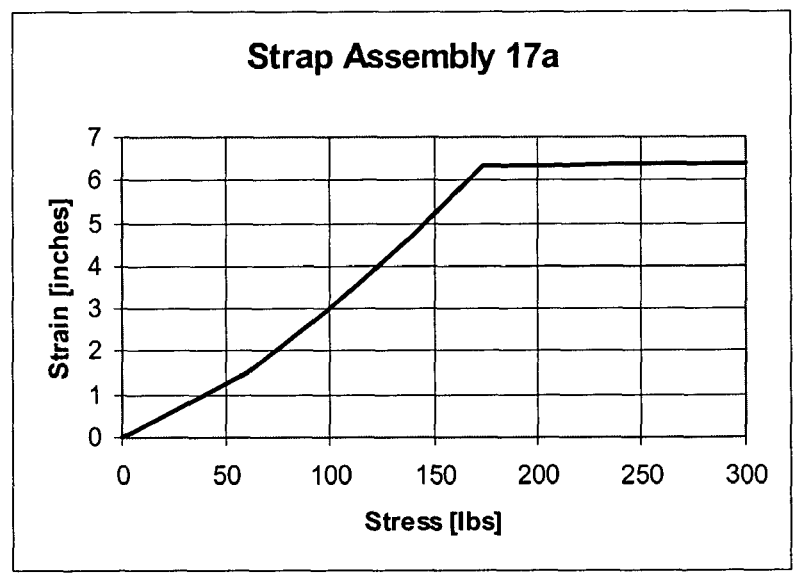
FIG. 16 is a plot of an elongation (strain) versus a weight applied (stress) for a second embodiment of the present invention wherein the bungee is restrained in elongation at an approximately predetermined length.

Referring to FIG. 8, the elastic strap assembly (17a) is shown with the sheath (34) on it in a relaxed position as shown in FIG. 13. Moving on to FIG. 9, the elastic strap assembly (17a) is in the stretched position shown in FIG. 14 with the sheath (34) at its extended position not allowing the rubber (20) to stretch anymore. A plot of the stress/strain relationship for the strap assembly (17a) is shown in FIG. 16. The stretch is limited to an approximately predetermined value. In this case, the approximately predetermined value is slightly less than six and a half inches. The sheath (34) is not completely rigid, so a small amount of stretch is noticeable even when the elastic strap (17) has reached the length of the sheath (34).

Obviously many modifications and variations of the present invention are possible in light of the above teachings. It is therefore to be understood that, within the scope of the appended claims, the invention may be practiced otherwise than as specifically described.

I claim:

1. Apparatus comprising:
a tree stand operatively attached to a tree, said tree stand having a platform disposed substantially horizontally while the tree stand is attached to the tree;
a first strap disposed around and secured to the tree;
a second strap for being disposed around a person;
a strap assembly operatively attached at one end thereof to the first strap and operatively attached at the other end thereof to the second strap, said strap assembly being between six (6) and fifteen (15) inches long in a relaxed condition, said strap assembly being capable of stretching at least three (3) inches under a force of three hundred (300) pounds; and
a tether operatively attached to the first strap at one end thereof and to the second strap at the other end thereof, said tether being longer than the strap assembly when the strap assembly is fully stretched.

2. The apparatus of claim 1 wherein said second strap is part of a multi-strap harness.

3. The apparatus of claim 1 wherein the length of the strap assembly when fully stretched is less than the distance between a part of the platform in contact with the tree and a part of the platform farthest from the tree.

4. The apparatus as in claim 1, wherein said strap assembly has a resilient portion that is capable of supporting a load in excess of 300 pounds in a suspended fashion.

5. The apparatus as in claim 4, wherein the resilient portion of the strap assembly is fabricated from a core of hard rubber material.

6. The apparatus as in claim 5 wherein the resilient portion of the strap is made mostly of natural rubber.

7. The apparatus as in claim 1, wherein the strap assembly and the tether are independently connected between said first strap and said second strap.

8. The apparatus as in claim 7, wherein the effective length of the strap assembly is less than the effective length of the tether.

9. The apparatus as in claim 1, wherein the strap assembly has opposed ends each having a generally barrel shaped configuration and an intermediate portion having a generally figure eight cross-sectional configuration.

10. The apparatus as in claim 9, wherein the barrel shaped opposed ends of the strap assembly are aligned generally perpendicular to the longitudinal axis of the intermediate portion of the strap assembly.

11. The apparatus of claim 1 wherein said strap assembly stretches no more that fifteen (15) inches under a load of three hundred (300) pounds.

12. Apparatus comprising:
a first strap adapted to be disposed around and secured to a tree;
a second strap for being disposed around a person; and
a strap assembly operatively attached at one end thereof to the first strap and operatively attached at the other end thereof to the second strap, said strap assembly being between six (6) and fifteen (15) inches long in a relaxed condition, said strap assembly being capable of stretching at least three (3) inches under a force of three hundred (300) pounds; and
a tether operatively attached to the first strap at one end thereof and to the second strap at the other end thereof, said tether being longer than the strap assembly when the strap assembly is fully stretched.

13. The apparatus of claim 4 wherein said second strap is part of a multi-strap harness.

14. The apparatus of claim 12 wherein the strap assembly comprises a rubber strap with D-rings attached to each end thereof.

15. The apparatus of claim 14 wherein the rubber strap is approximately eight and one half inches long in a relaxed condition.

16. The apparatus of claim 15 where in the strap assembly, including the D-rings is approximately ten inches long in a relaxed condition.

17. The apparatus of claim 14 wherein said tether comprises a nylon sheath disposed around said rubber strap.

18. The apparatus of claim 17 wherein said sheath has one end extending through one of the D-rings and another end thereof extending through the other one of the D-rings.

19. The apparatus of claim 18 wherein said sheath is substantially longer than the length of the rubber strap in a relaxed condition.

20. The apparatus of claim 19 wherein said sheath has a loop on an intermediate portion thereof where the sheath covers the rubber strap; and wherein the other end of the sheath is disposed under the loop when the rubber strap is in a relaxed condition and is pulled out of the loop when the rubber strap has stretched sufficiently to pull the other end of the sheath out of the loop.

21. The apparatus of claim 12 wherein said strap assembly stretches no more that fifteen (15) inches under a load of three hundred (300) pounds.

22. The apparatus of claim 12 wherein the tether comprises a nylon strap.

23. Apparatus comprising:
a tree;
a tree stand operatively attached to the tree, said tree stand having a platform disposed substantially horizontally while the tree stand is attached to the tree;
a first strap disposed around and secured to the tree;
a second strap for being disposed around a person;
a strap assembly operatively attached at one end thereof to the first strap and operatively attached at the other end thereof to the second strap, said strap assembly being between six (6) and fifteen (15) inches long in a relaxed condition, said strap assembly being capable of stretching at least three (3) inches under a force of three hundred (300) pounds; and
a tether operatively attached to said first strap and to said second strap, said tether being longer than the strap assembly.

* * * * *